Nov. 24, 1970 M. KLEIN ET AL 3,542,961

CALL FORWARDING EQUIPMENT FOR OPERATORS

Filed Dec. 20, 1967 2 Sheets-Sheet 1

INVENTORS: M. KLEIN
R. A. WALSH

BY Frederick W. Padden
ATTORNEY 3,542,961

CALL FORWARDING EQUIPMENT FOR OPERATORS

Milton Klein and Richard A. Walsh, Lincroft, N.J., assignors to Bell Telephone Laboratories, Incorporated, Murray Hill, N.J., a corporation of New York Filed Dec. 20, 1967, Ser. No. 692,024
Int. Cl. H04m 3/54
U.S. Cl. 179—18 11 Claims

ABSTRACT OF THE DISCLOSURE

Telephone switching offices are disclosed including route translators and control equipment for forwarding calls for a first unattended operator position directly to a second attended position situated in a different office. The equipment is activatable over a control connection established by the operator-in-attendance to generate selectable routing instructions which are utilized on subsequently originated calls for the unattended position.

BACKGROUND OF THE INVENTION

This invention relates to communication switching systems and particularly to the call forwarding equipment used in telephone systems for improving customer services by selectively routing calls directly to a distant operator under her control when a called local operator position is unattended.

New facilities are continually supplied by telephone companies to fulfill customer demands for better and speedier services at reasonable cost. As a consequence of such demands, definite progress has been obtained in improving the service furnished to customers by switchboard operators. Imaginative and new switchboard circuitry is now available which simplifies the operator's task and increases her call serving capacity. However, there has been a recognized need for an improvement in switchboard call forwarding facilities to furnish operator service at a distant location when a local switchboard is unattended.

Existing systems utilize patch cords and special key arrangements for patching or switching an unattended switchboard to an attended one. These cord and key arrangements are customarily used for switchboards in a so-called line line-up at a single location. They have not proven to be economical for switching calls to a distant location because additional trunking facilities must be dedicated for the service. Moreover, such arrangements often need an undesirably large amount of equipment space and require calls to be switched through the unattended switchboard. Although the latter arrangements are costly, many customers such as corporations and government agencies having a plurality of business locations require service by an attending operator in one of the locations when the switchboards at the other locations are unattended. Accordingly, such service demands necessitate the installation of costly, complex and often inefficient, switching and dedicated trunking arrangements between business locations.

It is therefore apparent that a need exists for equipment which automatically forwards calls to an attended distant switchboard without switching them through a local unattended switchboard. A further need is to reduce the requirement for patch cords and special key arrangements as well as dedicated trunking facilities for serving calls at a distant switchboard when a local switchboard is unattended.

SUMMARY OF THE INVENTION

In accordance with the principles of this invention equipment is illustratively provided for automatically routing calls originally destined for an unattended operator position in a first central office (for example, in Philadelphia) directly to an attended operator position in a second central office (for example, in California) without the need for switching calls through the unattended position and without the need for dedicated trunking. The equipment is advantageously located in the first central office and is activatable to route all of the calls to the attended operator position via the interoffice trunking facilities which are shared by other callers. The equipment includes translation apparatus for automatically changing the routing of calls from the unattended position to the attended position so that the calls are not routed through the unattended position.

The equipment is illustratively controlled by the attending operator over a control connection which is established between the two offices utilizing existing interoffice trunks and associated circuitry. The latter operator effects the transmission of a call forwarding signal over the control connection to operate a remotely controlled circuit in the first office. The remote circuit, in turn, activates a special route translation circuit in the common control facilities of the first office for altering the stored routing instructions which are utilized during the attended periods to switch calls to operator positions in the same office. Thereafter, the control connection is released. It is a salient aspect of this invention that the different or altered routing instructions are provided on subsequent calls which normally would be routed to the unattended operator position in the first office, but, which under control of equipment in accordance with our teaching, are forwarded through the first office to the attendant position at the second office.

To elaborate, the remotely controlled circuit is connected to a termination in the switching network of the first office advantageously to provide convenient access for establishing the control connection. The circuit includes a detector for sensing the transmitted call forwarding signal as well as the apparatus for signaling the route translator of the common control circuits to initiate a call forwarding operation when the latter circuit is idle. When this operation occurs, the route translator returns a verification signal to the remote control circuit which thereafter sends a tone to the distant operator to inform her that the requested service has been actuated.

Our illustrative embodiment advantageously utilizes an originating register which is responsive to the receipt of a class mark generated during a dial tone connection of a call for automatically determining that the call is to be routed to an operator without waiting for dial pulses. Such a class mark ordinarily would control the aforementioned route translator to switch calls to the unattended operator position. However, in accordance with our invention the translator is actuated, as previously described, for changing the routing so that calls instead of being routed to the unattended position are directly switched through the first and second offices to an attended operator position connected to the second office.

Another feature of the remotely controlled circuit is that it is controllable for performing the foregoing call forwarding functions in response to signals transmitted from other locations such as for example a subscriber station connected to the first office.

In view of the foregoing, our invention provides a call forwarding system in which prescribed calling lines are furnished with call forwarding service by being uniquely identified with a special class mark. This mark controls special route translation apparatus selectively to route calls to a first or second called line. Advantageously, either of such lines can be a switchboard position or an ordinary telephone line. In the illustrative embodiment of our invention, the mark is utilized on each call from one of the prescribed lines for producing a so-called "dial zero" address code which is identified with calls routed to operators for service. In turn, the address code operates a predetermined one of two route relays in the special route translator apparatus for generating predetermined instructions for controlling the routing of calls to a local or distant switchboard. It is a feature of our invention that the particular one of the route relays, operated as abovedescribed, is determined by the unique class mark and call forwarding apparatus which includes transfer means for selectively switching between the route relays in accordance with the desired destination switchboard to serve the call.

BRIEF DESCRIPTION OF THE DRAWING

The foregoing and other structural aspects and advantages of this invention will be more clearly understood from a reading of the following description of an illustrative embodiment with reference to the drawing in which.

Figure 1:
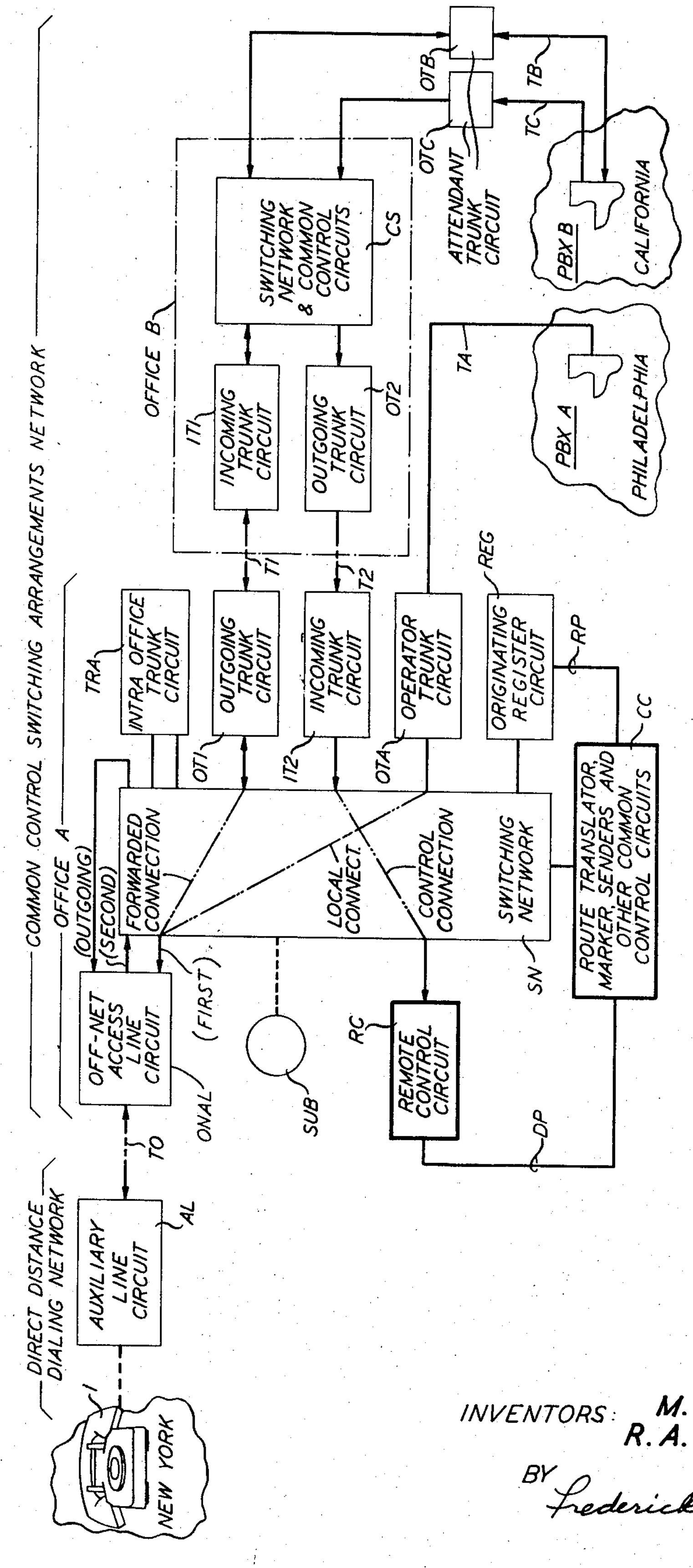
FIG. 1 shows a block diagram depicting an illustrative embodiment of a call forwarding system in an office A interconnected with a DDD (direct distance dialing) network and with an office B.

As shown in the drawing, the call forwarding equipment at office A includes a remote control circuit RC and a route translator in circuits CC both of which may be advantageously incorporated in an automatic telephone system wherein common control circuits are utilized to control the establishment of calls through a switching network. One such system is disclosed in A. J. Busch patent 2,585,904 issued Feb. 19, 1952. Our illustrative equipment is disclosed herein in offices A and B each of which is of the type disclosed in the Busch patent. It is noted that operator trunk circuits OTA, OTB and OTC respectively connect offices A and B to private branch exchanges PBX A and PBX B for providing answering service. The PBX system disclosed in H. H. Abbott et al. Patent 3,037,086, issued May 29, 1962, comprises a cord switchboard for answering calls via tie trunk facilities and is usable herein as an illustrative embodiment of the operator answering equipment. As shown in the drawing, the illustrative equipment of our invention is particularly concerned with the details of the circuits shown in heavy lined blocks in FIG. 1. Only those aspects of the other equipment units which are needed for a complete understanding of our invention are described herein in detail. Reference may therefore be made to the aforementioned patents for a more complete understanding of the construction and operation of such other equipment.

GENERAL DESCRIPTION

The functions and interrelations of the equipment of the exemplary embodiment are now described with reference to FIG. 1. In FIG. 1 are shown the essential switching units for interconnecting the auxiliary line circuit AL with switchboard PBX A for furnishing operator assistance on calls from the DDD network or for interconnecting the circuit AL with switchboard PBX B to provide such assistance in the event that the PBX A switchboard is unattended. It is to be understood that the subscriber 1, assumed to be in New York, is connected to the commercial direct distance dialing, or DDD, network and that he wants to gain access to a private line network, referred to as common control switching arrangements (CCSA), which access is available to him through operator assistance in the private line network. Accordingly, the auxiliary line circuit AL is a line circuit located in the last switching office of the commercial DDD network. The subscriber 1 dials the necessary dialing code to gain access to the line circuit AL as he would to gain access to any other connection in the commercial network. To simplify the drawing, and because this operation is the normal processing of calls in the commercial network and as such may include any number of intervening switching offices, none of the intervening offices have been included but their necessary presence is to be understood, as indicated by the broken line connecting subscriber 1 to the line circuit AL.

The off-net access line circuit ONAL is similarly the line circuit in the private line network through which access is obtained from the DDD network for calls incoming to the private line or CCSA network. As described below, it has multiple appearances on the switching network of office A. Our invention, however, is primarily directed to the control and automatic routing of calls to remote operators or switchboards at a private branch exchange PBX B, when the nearer switchboard at exchange PBX A is unattended. The equipments shown in FIG. 1 are also utilized to illustrate the establishment of a so-called control connection from switchboard PBX B to a remote control circuit RC situated at office A for controlling the common control circuits of the latter office to route calls directly to switchboard PBX B instead of to switchboard PBX A.

The switchboard PBX A is connected over a "local connection" to circuit AL to provide operator assistance on off-network calls, i.e., calls "off" or from the DDD network. Illustratively, the connection is established from circuit AL by using internetwork trunk T0, off-net access line circuit ONAL, switched links (designated local connection) of switching network SN, operator trunk OTA, tie trunk TA and switchboard PBX A. When PBX A is unattended, all incoming off-network calls on circuit AL are automatically connectable over a "forwarded connection" to PBX B via trunk T0, circuit ONAL, switched links (designated forwarded connection) of network SN, to outgoing trunk circuit OT1, interoffice trunk T1, incoming trunk circuit IT1, a path through switching network and common control circuits CS of office B, operator trunk circuit OTB, and tie trunk TB to switchboard PBX B.

Such off-network calls are established in accordance with instructions generated by a route translator of circuits CC at office A. The translator provides instructions for establishing a forwarded connection instead of a local connection upon the receipt for a tone signal from switchboard PBX B over a control connection. The latter connection is established, illustratively using tie trunk TC, attendant trunk circuit OTC, an idle path of circuits CS, outgoing trunk circuit OT2, trunk T2, incoming trunk circuit IT2 and a switched link (designated control connection) of network SN to remote control circuit RC which is connected via cable DP to the route translator of circuits CC.

As background for an understanding of an exemplary embodiment of this invention, the local routing of off-network calls to switchboard PBX A is briefly described. Assume that a call connection originates at station 1 in New York, and that a predetermined address code for extending calls to circuit AL is dialed from station 1 into a DDD network. In a customary manner, various common control circuits of the DDD network direct the establishment of a connection to circuit AL. Upon receipt of such a call, circuit AL transmits a seizure signal via trunk T0 to the circuit ONAL which signals for a dial tone connection to an originating register circuit REG of office A. As disclosed in Busch, a dial tone marker of circuits CC establishes a connection between register REG and a first appearance of the circuit ONAL via switched links of network SN. Also, the marker transmits to register REG a class mark which is translated therein and utilized by a completing marker of circuits CC to establish the connection designated local connection between circuit OTA and the first appearance of circuit ONAL. A PBX A operator situated in Philadelphia is then alerted.

As disclosed in Abbott et al., the A operator answers the call by inserting a back (answering) cord into a trunk jack terminating trunk TA. The operator can answer the call at her position or extend the call from circuit ONAL to a called subscriber. Calls are extended under control of the operator by signaling for the establishment of a dial tone connection to the second appearance of circuit ONAL and by dialing back over the local connection through circuit ONAL and into a register REG which is available for reuse at this time. In a customary manner, the called subscriber is connected to the second appearance by the action of circuits CC in response to the dialed address recorded in register REG. Upon verifying that the connection is complete, the operator releases the local connection for disconnecting circuit OTA from the first appearance.

If the Philadelphia PBX A is unattended the specific embodiment of this invention advantageously forwards off-network calls on circuit ONAL directly to the California PBX B. Such forwarded calls may be answered by the California operator or the calls may be extended from circuit ONAL to a called subscriber, for example, subscriber SUB in office A. Calls are extended in response to signals transmitted by the operator over the forwarded connection and advantageously the forwarded connection may be released when the calls are answered. The establishment of the forwarded connection differs from the local connection in that the completing marker automatically establishes a link connection (designated forwarded connection) between the first appearance of circuit ONAL and circuit OT1 instead of the local connection to circuit OTA in response to the translated class mark data stored in the register REG. Moreover, the connection is automatically extended via trunk T1, circuit IT1, circuits CS of office B and circuit OTB to the California operator switchboard under control of signals transmitted by a sender of circuits CC connected to circuit OT1 at office A. The instruction signals for controlling the establishment of the forwarded connection through offices A and B are determined at office A from a special translation in circuits CC of the class mark data stored in register REG. Special translation apparatus comprising circuits RC and CC utilizes the class mark data to generate different instructions for controlling the establishment of the forwarded connection to the California PBX B. In the illustrative embodiment, the special translation apparatus is controlled by signals from the California operator conveyed on a control connection.

To elaborate, the California operator initiates the establishment of a control connection by dialing the address of circuit RC. Such a connection is established through offices A and B in a customary manner and without the application of ringing by utilizing the dialed address to direct the establishment of a connection over circuit OTC, links of circuits CS, circuit OT2 and IT2, and switched links (control connection) of network SN to circuit RC. Circuit RC returns a steady or interrupted tone signal to the California operator for indicating the present status of the special translator apparatus, i.e., whether or not the apparatus is activated. Assuming, for example, that presently the apparatus is not activated and that the California operator desires to cause subsequent calls to be forwarded to her position, she effects the transmission of a signal which is conveyed on the control connection and received at circuit RC for activating the special transmission apparatus. The activated apparatus generates routing instructions on subsequent calls to direct the establishment of the forwarded connection so that calls originally destined for switchboard PBX A are instead directly routed to switchboard PBX B.

Considering now in particular the special translation apparatus consisting of the remote control circuit RC and the translator part of circuits CC shown in office A and in heavy lined block of FIG. 1, they are controllable advantageously locally from subscriber SUB, the Philadelphia PBX or remotely from the California PBX to cause the forwarding of calls on circuit ONAL to the California PBX. This obtains because a control connection can be established from subscriber SUB or from the Philadelphia operator position as well as from the California position in response to dialing the address of the circuit RC. Circuit RC is responsive to tone signals from such origins for altering the operation of translator relays in circuits CC to provide different routing instructions during call processing in response to a translation of an address stored in register REG. Dependent upon the existing state of the translator relays, the signal can either activate or de-activate the special translation apparatus. Circuit RC includes apparatus for returning a status tone which changes upon receipt of a signal to indicate the effectiveness of the signal to activate or deactivate the apparatus. After a control connection is released, the translation apparatus is effective to provide routing instructions in accordance with the signal until a tone signal is again received at circuit RC. It is also noted that access to circuit RC is denied by screening the class marks of requesting circuits in a customary manner and allowing only circuits with certain class marks to be connected thereto.

Before proceeding with further details of the circuit operation, it seems advisable broadly to present an explanation of the operation of circuit ONAL which provides two-way access for calls between the DDD network and the common control switching arrangements CCSA network. The term CCSA network refers to a private line switched network with sophisticated common control switching arrangements for private service features such as, for example, automatic message accounting, automatic maintenance testing and others. As noted previously, circuit ONAL is connected to two appearance or terminals, designated first and second in FIG. 1, on one side of network SN as well as to a third appearance on the opposite side of network SN. Incoming calls on circuit ONAL utilize the first appearance and outgoing calls are connected to the third appearance. The circuit ONAL provides a splitting arrangement which is effective during the establishment of a local or forwarded connection to isolate the DDD subscriber from switching machine signals.

The circuit ONAL operates on a so-called "released loop" basis to extend incoming calls to called terminals via the second appearance. Such loops are the aforementioned forwarded and local connections and include the switch paths and interconnected circuitry between the first appearance of circuit ONAL and respectively switchboard PBX B and switchboard PBX A. The loops are temporary paths in that they are utilized to control the establishment of a connection from the second appearance of circuit ONAL and thereafter released when the latter connection is answered. One example of released loop operation is disclosed in H. R. Banks et al., United States patent application Ser. No. 402,531, filed Oct. 8, 1964.

More specifically, the extension of calls via the second appearance is initiated by a start signal received at the first appearance. In response thereto the ONAL circuit transmits a signal to circuits CC for directing the establishment of a dial tone connection on the second appearance. Dial pulses subsequently received on the first appearance are coupled by circuit ONAL to register REG which is connected to the second appearance. Thereafter, circuits CC control the establishment of a connection between the second appearance and a terminal identified by the dial pulses. The connection to the first appearance, or loop, is released under control of a signal transmitted by the operator or automatically, when the called party answers.

DETAILED DESCRIPTION

Figures 2, 3:
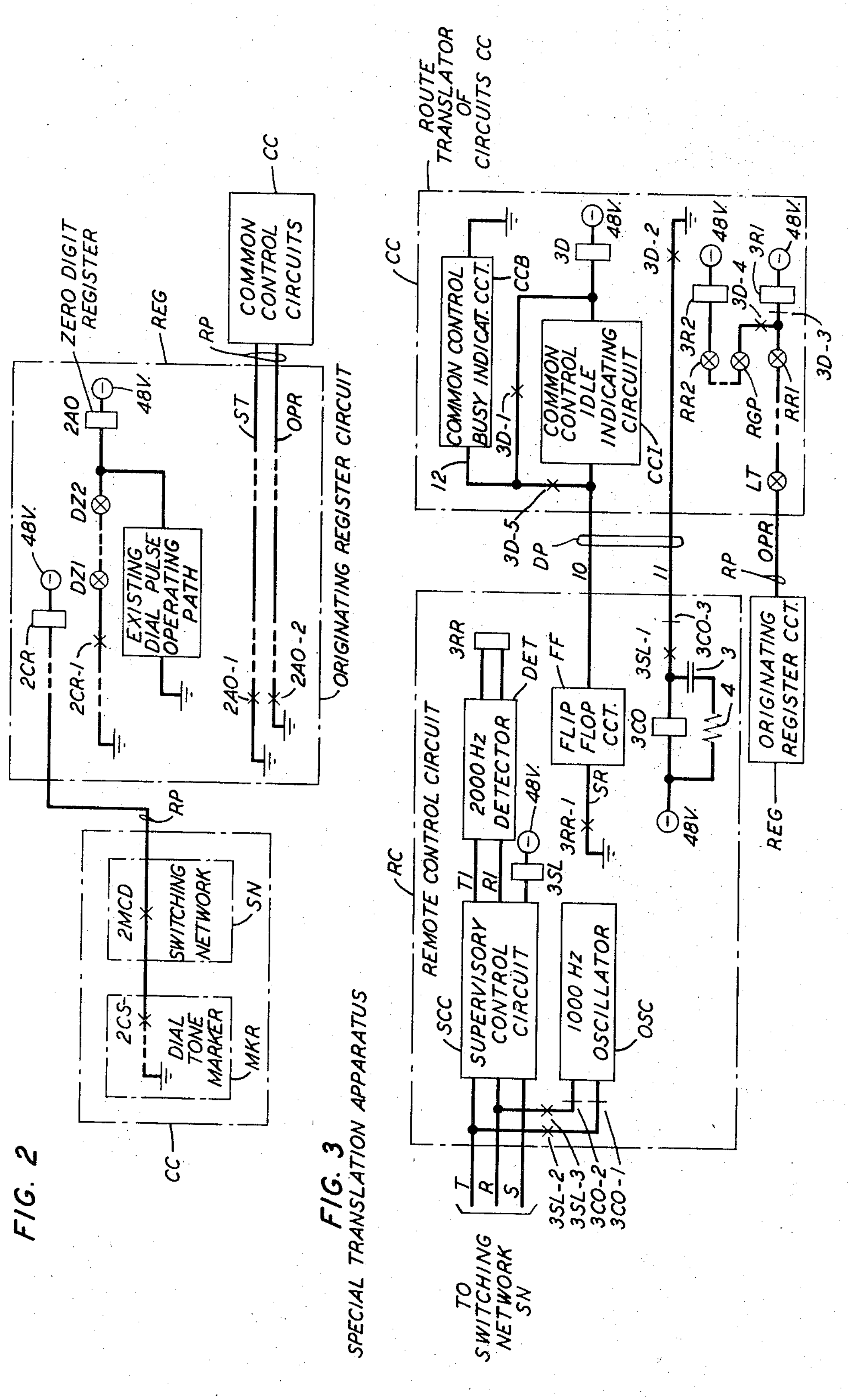
FIG. 2 sets forth an illustrative embodiment of circuitry in common control circuits CC and an originating register circuit REG of office A for determining an address from a class mark to direct the routing of call connection.
FIG. 3 illustratively depicts circuit details of special translation apparatus comprising a remote control circuit RC and a route translator of common control circuits CC which are situated in office A.

Referring now to FIGS. 2 and 3, a detailed description will be presented of the circuit operations for establishing a local connection and a forwarded connection as well as of circuitry responsive to signals on a control connection. FIG. 2 depicts the circuitry for deriving an address code from a class mark assigned to circuit ONAL to direct the routing of a call connection in offices A and B. FIG. 3 sets forth details both of circuit RC and the route translator of circuits CC for generating routing instructions from a translation of the address code to establish local or forwarded connections.

Class mark translation

Incoming calls on circuit ONAL destined for selective connection to PBX A or PBX B are automatically routed through network SN to originating register REG on a dial tone connection as disclosed in Busch. During the establishment of the latter connection, circuits CC transmit a class mark unique to circuit ONAL to register REG for informing that register that no directing digits are to be received from the DDD network and that circuits CC may be immediately activated to establish selectively the local or forwarded connection. Advantageously, the class mark is transmitted over a path from ground, contact 2CS– in dial tone marker MKR, contact 2MCD of network SN, a lead in cable RP and other apparatus (not shown) to the winding of relay 2CR. In operating, contact 2CR–1 is closed for extending ground supplied through other contacts (not shown) to the "dial zero for operator" terminal DZ1. The latter is cross-connected to terminal DZ2 for operating relay 2AO which is a register for storing a zero address code for causing control circuits to route calls via terminals of network SN and circuits CS to switchboard PBX A or PBX B. Relay 2AO is also operable on other calls in response to the receipt of a dial pulsed zero digit which is connected via the circuit labeled "existing dial pulse operating path." When relay 2AO operates under control of relay 2CR, contact 2AO–1 connects ground via other contacts (not shown) and start lead ST to a completing marker for requesting a connection between register REG and a completing marker of circuits CC for completing the establishment of a connection to either the Philadelphia operator or to the California operator.

Local connection (Philadelphia)

When the completing marker is available to process the call, register REG is connected to a route translator of circuits CC for transmitting thereto the address code stored by relay 2AO. Referring to FIG. 3, cable RP connects register REG to circuits CC for conveying a ground on a cable lead OPR to terminal LT. Note that ground is applied on lead OPR by contact 2AO–2 as shown in FIG. 2. Terminal LT is cross-connected to terminal RR1 for coupling the ground via nonoperated contact 3D–3 to operate a first route relay 3R1. Contacts (not shown) of relay 3R1 generate instructions which are used by the completing marker to establish a connection between the first appearance of circuit ONAL and switchboard PBX A via circuit OTA.

Forwarded connection (California)

The route translator of circuits CC includes a relay 3D which is utilized for altering the routing instructions in such a manner that calls to switchboard PBX A are routed to switchboard PBX B as hereinafter described. Relay 3D is operated for extending a ground applied to lead OPR, as previously described, to cause the operation of a second route relay 3R2 instead of relay 3R1. As a result, routing instructions are generated for routing the call to the California operator. Relay 3R2 is operated over a path which includes ground in register REG, lead OPR, terminal LT, a cross-connection wire between terminals LT and RR1, contact 3D–4, and a cross-connection wire between terminals RGP and RR2. The instructions generated as a result of the operation of relay 3R2 are coupled to the completing marker for causing it to (1) establish a connection between the first appearance of circuit ONAL and circuit OT1 and (2) connect a sender of circuits CC to circuit OT1 for outpulsing a zero digit thereover to office B.

To elaborate, the first appearance is connected via switched links of network SN to circuit OT1 ond the dial tone connection to register REG is released. Circuit OT1 is also connected via a sender link (not shown) to a sender which stores a zero digit for outpulsing over trunk T1 to office B. After an appropriate delay to allow for the attachment of a register to circuit IT1, sender transmits the stored digit. Thereafter, circuits CS direct the establishment of a connection between circuits IT1 and OTB. In turn, circuit OTB signals the PBX B operator over tie trunk TB and the call is subsequently answered.

Special translation apparatus (FIG. 3)

Relay 3D of circuits CC is controlled by circuit RC which is, in turn, controlled by a 2,000 hertz signal received on network leads T and R. Leads T, R and S of circuit RC are connected to a line link frame appearance in network SN and may be accessed in a customary manner by dialing the address assigned thereto. Relay 3SL in circuit RC operates from the supervisory control circuit when circuit RC is connected via network SN to another circuit such as for example circuit IT2 which is utilized in the establishment of a control connection. In operating, contacts 3SL–2 and 3SL–3 connect a 1,000 hertz oscillator OSC respectively via contacts 3CO–1 and 3CO–2 for returning either a steady tone if local operator routing is in effect, or an interrupted tone to indicate that the route translator is effecting the forwarding of calls to the California PBX. An interrupting tone is produced by the periodic operation of relay 3CO. If relay 3D is operated, as hereinafter explained, a ground is connected to the winding of relay 3CO over a path from ground which includes contact 3D–2 in circuits CC, lead 11 and contacts 3CO–3 and 3SL–1. Because of the presence of contact 3CO–3 in the aforementioned path, relay 3CO operates and releases at a rate determined by the respective values of capacitor 3 and resistor 4. In turn, oscillator OSC is periodically connected to leads T and R by contacts 3CO–1 and 3CO–2 to produce the intermittent tone. When relay 3D is released, relay 3CO does not operate and, accordingly, a steady tone is returned.

The special translation apparatus of FIG. 3 is illustratively responsive to the receipt of a 2,000 hertz tone signal on leads T and R for selectively controlling the operation of one of two route relays 3R1 or 3R2. Calls on circuit ONAL of FIG. 1 are routed to switchboard PBX A under control of routing instructions supplied by relay 3R1. Relay 3R2 selectively generates routing instructions for routing calls to switchboard PBX B instead of PBX A.

In the illustrative embodiment of our invention the 2,000 hertz tone signal originates at the remotely located California switchboard PBX B. It is within the purview of our invention to generate the tone signal locally such as at station SUB or even under control of the PBX A switchboard. The received tone is coupled via the T and R leads of FIG. 3 through the supervisory control circuit SCC, leads T1 and R1 to activate the detector DET and, in turn, cause the operation of signal register relay 3RR. In operating, relay 3RR closes its contact 3RR–1 to ground lead SR of the bistable flip-flop device FF for switching it to one of its two states whereby ground is applied to lead 10. It is noted that the last-mentioned state of flip-flop FF is unaffected by the removal of ground from lead SR and is reset only by reapplication of ground to lead SR. If circuits CC are idle, ground on lead 10 is connected by a common control idle indicating circuit CCI to operate relay 3D. Circuitry of circuit CCI prevents the operation of relay 3D during call processing because such operation could cause the routing of a call to a wrong number. Operated contacts 3D–1 and 3D–5 shunt circuit CCI for holding relay 3D operated both from ground on lead 10 as well as from ground on lead 12 via a common control busy indicating circuit CCB. The latter provides a holding ground for relay 3D while circuits CC are processing a call connection. Also, operated contacts 3D–3 and 3D–4 connect relay 3R2 instead of relay 3R1 to lead OPR respectively by opening the operating path of relay 3R1 and by interconnecting terminals RR1 and RR2 via terminals RGP and cross-connect wiring therefrom. Contact 3D–2 connects ground to lead 11 which as described hereinbefore causes the return of an interrupted tone instead of a steady tone to indicate that the special translation apparatus is activated.

Relay 3D is released by the subsequent transmission of a 2,000 hertz signal, advantageously either during the same control connection if for example an inadvertent error has been made, or on a subsequently established control connection. In response thereto, relay 3RR is once again operated and ground is applied by operated contact 3RR–1 to lead SR for resetting circuit FF. Accordingly, circuit FF removes ground from lead 10 opening one holding path via contacts 3D–5 and 3D–1 for relay 3D. Relay 3D thereafter releases during the idle period of circuits CC by the action of circuit CCB which removes ground from lead 12. In releasing, contact 3D–3 connects relay 3R1 to terminal RR1 to restore local routing and contact 3D–4 disconnects relay 3R2 from terminal RR1. Also, contact 3D–2 removes ground from lead 11 connected to the winding of relay 3CO to return a steady tone for indicating the new status of the special translation apparatus.

It should be noted that the present status of the special translation apparatus is facilely ascertainable by dialing the address of circuit RC and by listing for the returned signal.

Completion of operator answered calls

Off-network calls are completed via the second appearance of circuit ONAL to a called party under control of signals received on the first appearance. As disclosed previously, such calls are initially answered by an operator situated either at first PBX A in Philadelphia or, if the latter is unattended, at a second PBX B in California. Either PBX position, advantageously, can be utilized to control the extension of the call by transmitting signals on the first appearance connection to circuit ONAL. Control circuitry of circuit ONAL is connected to the communication path of the first appearance and is controllable in response to the receipt of the signals for (1) requesting a dial tone connection on the second appearance;
(2) coupling the first and second appearance to provide a through-dialing path to the connected register;
(3) releasing a circuit connected to the second appearance; and
(4) releasing the connection on the first appearance.

Circuit ONAL contains various features which are best explained by the context in a description of a call being extended to a called party. Assume that the first appearance is connected via a forwarded connection to the California operator. Upon receiving a request for a particular party, the operator depresses a key (not shown) for transmitting a signal on the interconnected circuits of the forwarded connection to circuit ONAL. It will be recalled that forwarded connection includes circuits OTB, CS, IT1, OT1, and a path through network SN. In response thereto, the circuit ONAL both requests a dial tone connection on the second appearance and establishes a metallic, or through-dial, connection between the first and second appearances. The metallic connection enables the operator to hear the dial tone transmitted by a connected originating register REG and also provides a path for coupling dial pulses, or multifrequency signals, received on the first appearance to register REG connected on the second appearance. In a customary manner, circuits CC are directed by the dialed address stored in register REG to establish a connection between the second appearance and the called party. Assuming the call is intended for subscriber SUB, circuits CC establish a connection thereto utilizing intraoffice trunk circuit TRA and switched links of network SN. Calls to subscribers terminated in office B require connection to an idle outgoing trunk and are extended as disclosed in Busch utilizing an interoffice trunk, an incoming trunk circuit of office B and a network path through circuits CS to the local subscriber (not shown).

The forwarded connection is released when the operator is satisfied that a proper connection on the second appearance is established. The release is initiated by a signal transmitted over the forwarded connection and received on the first appearance. In turn, the circuit ONAL opens a holding circuit (not shown) to release the switched links designed forwarded connection of network SN. This action causes the release of all circuits utilized in establishing the forwarded connection. The connection on the second appearance is, however, unaffected and it remains held under control of the called subscriber.

Although not disclosed in detail in the present illustrative embodiment, numerous applications of the principles of the disclosed invention are deemed apparent in the light of this teaching such as, for example, providing a plurality of route relays and signal detecting circuits in order that calls can be directly forwarded in response to the receipt of a certain signal to any one of a variety of operator locations. Furthermore, it is considered apparent to apply the teaching of this invention in a call distribution system for directly routing calls to a distant operator in response to a heavy traffic indication from a local operator position. Beyond these particular examples, numerous other arrangements may also be devised by those skilled in the art without departing from the spirit and scope of this invention.

What is claimed is:

1. Call forwarding equipment in a switching office for selectively routing calls on prescribed calling lines directly to an attended first communication line without the need for indirectly switching the calls initially to an unattended second communication line comprising, means responsive to the receipt of a class mark unique to said prescribed lines for producing an address code, a translator responsive to said code for generating instructions for routing calls on any of said prescribed lines to said second line, and call forwarding means responsive to the receipt of a call forwarding signal for actuating said translator automatically to alter said instructions for routing subsequentially received calls on said prescribed lines directly to said first line instead of to said second line.

2. The equipment claimed in claim 1 wherein said first and second lines are connected respectively to distant and local switchboard positions, and means controllable by said distant position for establishing a control connection to said call forwarding means for activating said translator for routing subsequently received calls on said prescribed lines directly to said distant switchboard position instead of to said local switchboard position.

3. The equipment recited in claim 2 further comprising means for furnishing a signal indication on said control connection, and said last mentioned means being controlled by said call forwarding means to furnish a signal indication that calls on said prescribed lines are being automatically routed to said distant switchboard position.

4. A route translator in the common control equipment of a communication switching office to control the routing of calls on prescribed calling lines to an attended first operator position at a first location when a second operator position at a second location is unattended and comprising, register means, first means connectable to said register means upon the receipt of a call on any one of said prescribed lines and being responsive to the receipt of an address code requesting a connection of said call to an operator position for generating first instruction signals for the connection of said call to said first operator position, second means connectable to said register means upon the receipt of a call on any one of said prescribed lines and being responsive to the receipt of said code for generating second instruction signals for the connection of said call to said second operator position, and call forwarding means including transfer means selectively activatable when said second operator position is to be unattended for connecting said first means instead of said second means to said register means for causing the generation of said first instruction signals on subsequently received calls on said prescribed lines to route said calls to said first position instead of to said second position.

5. The translator claimed in claim 4 wherein said first and second means comprises first and second route relays operable for generating said first and second instruction signals, said transfer means being activatable by call forwarding signals from said first operator position to connect said first route relay instead of said second route relay to said register means, and said first route relay being operable in response to the receipt of said code for generating said first instruction signals to route subsequently received calls on any of said prescribed calling lines to said first location instead of to said second location.

6. A telephone switching system comprising in a first office, means responsive to the receipt of a call on an originating terminal for producing a class mark, means responsive to the produced mark for supplying an address of a called terminal in said first office, a route translator including first means for translating the supplied address for generating control instructions, network switching means responsive to said instructions for establishing a network path between said originating and called terminals, second means in said translator selectively operable under control of said supplied address for generating different instructions, and further comprising in a second office, means for establishing a control call to said first office, and means for transmitting a signal to said first office to operate said second generating means, and means in said first office including said switching means being responsive to said different instructions for forwarding all subsequent originated calls from said originating terminal and on which said mark is produced automatically to a different called terminal in said second office.

7. The invention claimed in claim 6 further comprising a bistable device switchable to a first state in response to said signal for holding said second generating means operated to generate said different instructions on each said subsequent call on said originating terminal, and said device being switchable to a second state in response to a subsequently received signal for releasing said second generating means in order that calls on said originating terminal are routed to said called terminal.

8. The invention claimed in claim 6 wherein said forwarding means is responsive to a subsequently transmitted signal on said established control call for thereafter controlling said first and second generating means to generate instructions to route all subsequently originated calls to said called terminal.

9. The invention claimed in claim 8 further comprising indicating means for supplying first and second signal indications, and means for controlling the connection of said indicating means to said established control call for transmitting thereover said first signal indication when said forwarding means is effective to control the routing of said calls to said called terminal and said second signal indication when said forwarding means is effective to control the routing of calls to said different terminal.

10. A telephone switching system comprising in a first office having a switching network and a register, a trunk interconnecting said first office with a distant office, means for connecting said trunk to a first terminal in said first office switching network, switching control means controlled by said connecting means on receipt of a call on said trunk for causing said network to establish a connection between said terminal and said register, means included in said switching control means activated during the establishment of said connection for transmitting to said register a class mark of said first terminal, means in said register for storing said mark and including means for translating said mark into an address, means controllable by said address for generating routing instructions to control said switching control means to cause said network to establish a connection between said first and a called terminal, and further comprising means in said first office responsive to a control connection signal transmitted from a second office for altering said generating means to produce different instructions thereafter on subsequent calls on said trunk to cause said switching control means to establish connections to a different terminal of said switching network.

11. The invention claimed in claim 10 wherein said altering means comprises a signal register for recording signals from said second office, a two-state device controlled by said signal register for furnishing first and second signals, and further comprising in said generating means route selection means responsive to said first signal for generating routing instructions to establish connections to said called terminal and responsive to said second signal for generating routing instructions to establish connections to said different terminal.

References Cited

UNITED STATES PATENTS 3,363,063 1/1968 Kandel et al. .......... 179—18

KATHLEEN H. CLAFFY, Primary Examiner

D. W. OLMS, Assistant Examiner

U.S. Cl. X.R.

179—27